June 20, 1950  L. W. SIMONS  2,511,950
JACK REST FOR VEHICLE FRAMES
Filed March 15, 1948
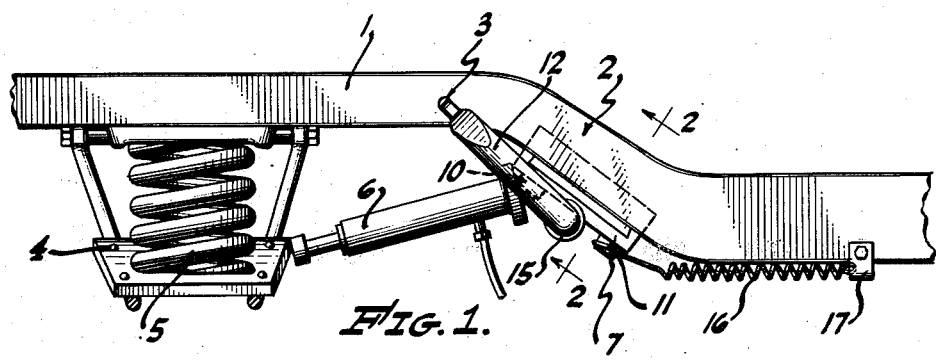
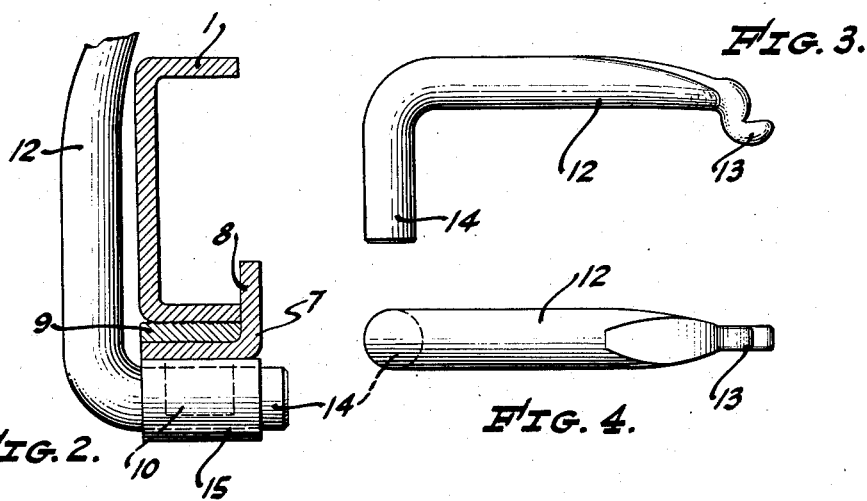
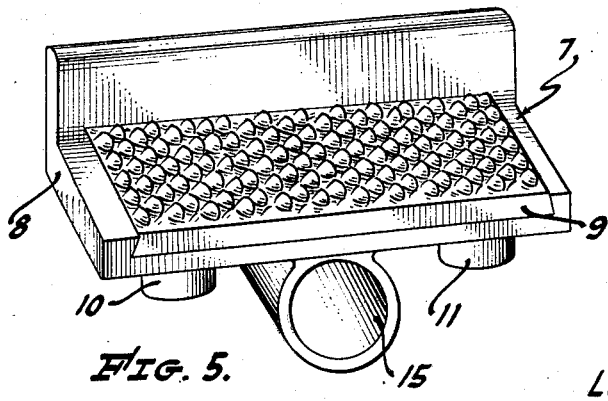
INVENTOR.
LOWELL W. SIMONS.
BY
ATTORNEY Patented June 20, 1950

2,511,950

UNITED STATES PATENT OFFICE 2,511,950

JACK REST FOR VEHICLE FRAMES

Lowell W. Simons, Long Beach, Calif., assignor of one-half to William N. Deatherage, Long Beach, Calif.

Application March 15, 1948, Serial No. 14,977

4 Claims. (Cl. 153—32)

This invention relates to a jack rest for vehicle frames, whereby a jack can be supported so that the jack can bear against the front wheel mount of a vehicle for the purpose of straightening this mount. In present day automobiles utilizing individual wheel supports for the front wheels this wheel support is at times knocked out of line, with the result that the two wheels do not track properly, and resulting in excessive tire wear, and also improper and hard steering. The front wheel support or A-frame when knocked out of line must be pushed forwardly, and to accomplish this, a support must be provided on the frame of the vehicle against which a jack can push in order to move this A-frame forwardly into correct alignment.

An object of my invention is to provide a novel jack rest for vehicle frames which can be quickly and easily positioned on the frame of a vehicle to act as a rest or support against which the jack can push when correcting alignment of the A-frame.

Another object of my invention is to provide a novel jack rest of the character stated which is simple in construction, inexpensive to manufacture, and which can be quickly and easily mounted on the frame for use.

A feature of my invention is to provide a novel jack rest of the character stated which can be applied to all modern vehicles without changing the construction of the rest.

Other objects, advantages and features of invention may appear from the accompanying drawing, the subjoined detailed description, and the appended claims.

In the drawing

Figure 1 is a side elevation of my jack rest in position on the frame of a vehicle.

Figure 2 is a fragmentary sectional view taken on line 2—2 of Figure 1.

Figure 3 is a plan view of the link.

Figure 4 is a side view of the same.

Figure 5 is a perspective view of the frame of my jack rest.

Referring more particularly to the drawing, the numeral 1, indicates the vehicle frame or chassis which is channel shaped in cross-section, all of which is usual and well known. Adjacent the front end of the frame 1, and usually immediately back of the engine, the frame is bent downwardly as shown at 2. Again, this construction is usual and well known.

In forming the frame 1, a number of holes 3, are provided therein, these holes being used during the forming of the frame. The holes 3 are utilized to support my jack rest as will be subsequently described. The A-frame 4, is supported on the chassis 1, and each of the front wheels are mounted on a frame 4, all of which is usual and well known in the art.

The usual coil springs 5, extend between the A-frame 4, and the chassis 1, in order to provide a spring support for the front wheels. At times the A-frame 4, will be bent rearwardly due to impact of the front wheels with a curb or other object. It is then necessary to push this frame 4, forwardly and this is accomplished by a jack 6, which presses against the back of the A-frame 4, and thus pushes this frame forwardly. The difficulty heretofore has been to provide an effective base, against which the jack 6, can push. For this purpose I provide a jack rest 7, which includes an angular frame 8, which is held against the inclined portion 2, of the chassis 1.

A plate 9, is mounted in the frame 8, and this plate is formed like a rasp in that it has a large number of sharp teeth projecting from the upper face, and these teeth are pressed into the chassis 1, when a load is placed on the rest 7. A pair of bosses 10, 11, are integrally formed with the frame 8, and these bosses act as a bearing or base for the jack 6, substantially as shown in Figure 1. There are two bosses provided since my jack rest can be used on either the right or left side of the vehicle. To hold the frame 8 in proper position, I provide a link 12, at one end of which an offset finger 13, is formed. This offset finger enters the hole 3, and the other end of the link is bent as shown at 14, to enter the collar 15, on the frame 8. Thus the frame 8, will be properly positioned and aligned so as to engage the bottom of the inclined portion 2, of the chassis 1, and being in proper position to act as a rest for the bottom of the jack 6. To hold the entire jack rest in position on the chassis 1, while the jack 6, is being placed in working position, I may provide a spring 16, which hooks over one of the bosses 10, or 11, and the other end is clipped to the chassis 1, by means of the metal clip, 17.

In operation, the workman first places the link 12, in the chassis 1. The bent end 14, of the link, is then placed in the collar 15, and thereafter the rest 7, is swung upwardly against the bottom of the chassis 1. The jack 6 is now placed against one of bosses 10, 11, and the other end is placed against the A-frame 4. The jack 6, is now operated and when pressure is placed on the rest 7, the teeth in the plate 9, will be driven into the chassis 1, thus effectively holding the jack rest against slipping. To bend the A-frame 4, several tons of pressure are required, and consequently the link 12, alone is not sufficient to hold the rest. The plate 9, provides the additional gripping surface so that this load can be carried.

Having described my invention, I claim:

1. A jack rest for vehicles and supportable on a vehicle chassis having a hole therein, said jack rest comprising an elongated member, teeth on the elongated member, said teeth being adapted to be pressed into the chassis, and a link, one end of said link being mounted in said elongated member and the other end of said link being adapted to be inserted into the hole in the chassis.

2. A jack rest for vehicles and supportable on a vehicle chassis having a hole therein, said jack rest comprising an elongated member, teeth on the elongated member, said teeth being adapted to be pressed into the chassis, and a link, one end of said link being mounted in said elongated member and the other end of said link being adapted to be inserted into the hole in the chassis, and a boss projecting from the elongated member, said boss being engaged by a jack.

3. A jack rest for vehicles and supportable on a vehicle chassis having a hole therein, said jack rest comprising an angle frame, a plate mounted in said frame, teeth on the plate adapted to be pressed into the chassis, a collar on the frame, a link, one end of said link being fitted into the collar and a finger on the other end of said link adapted to be inserted into the hole in the chassis.

4. A jack rest for vehicles and supportable on a vehicle chassis having a hole therein, said jack rest comprising an angle frame, a plate mounted in said frame, teeth on the plate adapted to be pressed into the chassis, a collar on the frame, a link, one end of said link being fitted into the collar and a finger on the other end of said link adapted to be inserted into the hole in the chassis, and a spring attached to said frame, and means securing one end of the spring to the chassis.

LOWELL W. SIMONS.

REFERENCES CITED

The following references are of record in the file of this patent:

UNITED STATES PATENTS

| Number | Name | Date |
|---|---|---|
| 2,059,972 | Smith et al. | Nov. 3, 1936 |